(12) United States Patent
Torvinen

(10) Patent No.: US 7,352,997 B2
(45) Date of Patent: Apr. 1, 2008

(54) METHOD, APPARATUS AND SYSTEM FOR HOSTING A GROUP OF TERMINALS

(75) Inventor: Marko Torvinen, Espoo (FI)

(73) Assignee: Nokia Corporation, Espoo (FI)

( * ) Notice: Subject to any disclaimer, the term of this patent is extended or adjusted under 35 U.S.C. 154(b) by 565 days.

(21) Appl. No.: 10/641,329

(22) Filed: Aug. 14, 2003

(65) Prior Publication Data

US 2005/0037708 A1    Feb. 17, 2005

(51) Int. Cl.
*H04B 7/00*    (2006.01)
(52) U.S. Cl. ................. 455/41.2; 455/41.3; 455/59; 455/61; 455/11.1; 370/259; 370/260
(58) Field of Classification Search ............ 455/41.2, 455/41.3, 59, 61, 11.1; 370/259, 260
See application file for complete search history.

(56) References Cited

U.S. PATENT DOCUMENTS

| 7,039,033 | B2* | 5/2006 | Haller et al. ............. 370/338 |
| 2003/0027525 | A1* | 2/2003 | Moore et al. ............. 455/41 |
| 2003/0154398 | A1* | 8/2003 | Eaton et al. ............. 713/201 |

* cited by examiner

*Primary Examiner*—Sanh D. Phu
(74) *Attorney, Agent, or Firm*—Hollingsworth & Funk, LL

(57) ABSTRACT

A method, apparatus, and system allowing terminal hosted group activities is provided, whereby proximity and non-proximity connections between a hosting mobile terminal and participating terminals enables group hosting activity. The hosting mobile terminal guides information flow between itself, the participating terminals, and optionally, with network servers that may assist the hosting mobile terminal. The hosting mobile terminal provides group management, profiling, downloading, presence, gaming, payment/charging, and authentication functions either in terminal only mode, or alternatively in conjunction with server assistance.

22 Claims, 10 Drawing Sheets ns, and a transceiver configured to facilitate the message exchange with the group of mobile terminals. The hosting module facilitates group related services to the group of mobile terminals.

METHOD, APPARATUS AND SYSTEM FOR HOSTING A GROUP OF TERMINALS

FIELD OF THE INVENTION

This invention relates in general to group hosting, and more particularly, to mobile terminal facilitated group hosting with optional network server assistance.

BACKGROUND OF THE INVENTION

Service enablers are the basic technology building blocks for creating mobile services. The implementation of service enablers can potentially take place in many places along the end-to-end chain, i.e., from the mobile terminal to the fixed network server. Many new service enablers are needed to produce compelling new services and enable the next growth wave for the mobile industry.

The concept of enabling services has largely been perceived between a single service subscriber and a single content server. Often, multiple service subscribers are in need of a single service, where individual sessions between each subscriber and the content server are required. As such, large amounts of resources such as memory and transmission bandwidth are needlessly consumed from the server, since each subscriber requiring service additively drains the server's resources.

Many service enablers in existence today could be more effective and thus provide the subscriber with a richer experience, if they could be offered and managed in a group fashion. For example, any situation where groups of people are gathered together, whereby common information of interest may be accessed by every member of the group, would enrich his or her user experience by such a common information interface. In such a group situation, service enablers such as browsing, delivery, messaging, content adaptation, and presence could be enhanced by the common interface.

The essence of mobile browsing lies in its close alignment with widely accepted Internet standards, where page description language, control formatting language, and scripting language are used to provide the user with a more intuitive interface. The browsing interface may be made even more intuitive in group situations where a common interface is required so that each member may access information or pre-composed data that is of interest to the members.

In the prior art, however, there exists no such mobile terminal that is capable of managing group activities. Prior art access to group activities is necessarily conducted at the network server level, but the network server is obviously not mobile and, therefore, incapable of providing position related services. There are many situations in which group hosted activity must necessarily be conducted in proximity to the group. Such is the case, for example, with group tours in museums, group events in local drinking establishments, etc., where local stimuli affects the way in which the group host interacts with the group members. For example, supplying a common link to interesting content pertaining to a particular painting that each member of the group is currently viewing. Conversely, supplying a trivia quiz at a local pub, whereby prizes are given away for the most correct answers, are two examples that require a localized, mobile group host for enhanced user interaction.

Accordingly, there is a need in the communications industry for a method, system, and apparatus that exploits the capabilities of mobile terminals to increase the number of value added services that may be facilitated through their use. In particular, the capabilities of mobile terminals needs to be exploited, so that they may function alone as group hosts, or alternatively, may coordinate with network servers to provide the group hosting function.

Additionally, the coupling mechanism used to exploit the capabilities of the mobile terminal needs to be adapted to enhance the services provided to a group of mobile terminals. In such an adaptation, the user's total experience in using the particular application while in a group setting may be enhanced through the operation of the group hosting mobile terminal.

SUMMARY OF THE INVENTION

To overcome limitations in the prior art, and to overcome other limitations that will become apparent upon reading and understanding the present specification, the present invention discloses a system, method, and apparatus for providing mobile terminal group hosting functionality. The present invention enables management and guidance of a group in a concentrated manner during the session and facilitates sharing of data/software with the group. A new class of services is provided by the present invention by enhancing current services with mobility and personalization, whereby guided sessions enables mobile services for small groups where similar location specific services have not previously existed.

In accordance with one embodiment of the invention, a method of conducting group hosting functions using a mobile terminal is provided. The method comprises establishing a wireless connection between the mobile terminal and a plurality of participating terminals, receiving messages from the plurality of participating terminals that relate to a common activity between the plurality of participating terminals, and providing services to the plurality of participating terminals in response to the messages, wherein the mobile terminal facilitates the services provided.

In accordance with another embodiment of the invention, a group hosting system is provided. The group hosting system comprises a group of mobile terminals wirelessly coupled to provide communication relative to an activity common to the group of mobile terminals, and a host terminal arranged to receive the communication from the group of mobile terminals. The services are provided to the group of mobile terminals by the host terminal to facilitate the activity.

In accordance with another embodiment of the invention, a mobile terminal wirelessly coupled to a network which includes a group of mobile terminals operating in accordance with a group activity is provided. The mobile terminal comprises a memory capable of storing at least one of a protocol module and a hosting module, a processor coupled to the memory and configured by the protocol module to enable message exchange with the group of mobile terminals, and a transceiver configured to facilitate the message exchange with the group of mobile terminals. The hosting module facilitates group related services to the group of mobile terminals.

In accordance with another embodiment of the invention, a computer-readable medium having instructions stored thereon which are executable by a mobile terminal for providing group host services to a group of mobile terminals is provided. The instructions perform steps comprising establishing a wireless connection to the group of mobile terminals, maintaining a list of mobile terminals receiving the group host services, and interacting with the group of mobile terminals. The interaction relates to a common activity shared by the group of mobile terminals.

In accordance with another embodiment of the invention, an assistance server coupled to a mobile group hosting terminal is provided. The assistance server comprises means for establishing a wireless connection to the mobile group hosting terminal, means for receiving support requests from the mobile group hosting terminal, and means for providing assistance to the mobile group hosting terminal in response to the support requests.

In accordance with another embodiment of the invention, a computer-readable medium having instructions stored thereon which are executable by an assistance server is provided. The instructions perform steps comprising establishing a wireless connection to the mobile group hosting terminal, receiving support requests from the mobile group hosting terminal, and providing assistance to the mobile group hosting terminal in response to the support requests.

These and various other advantages and features of novelty which characterize the invention are pointed out with greater particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of a system and method in accordance with the invention.

BRIEF DESCRIPTION OF THE DRAWINGS

The invention is described in connection with the embodiments illustrated in the following diagrams.

DETAILED DESCRIPTION OF THE INVENTION

In the following description of the exemplary embodiment, reference is made to the accompanying drawings which form a part hereof, and in which is shown by way of illustration various embodiments in which the invention may be practiced. It is to be understood that other embodiments may be utilized, as structural and operational changes may be made without departing from the scope of the present invention.

Generally, the present invention is directed to a method, apparatus, and system that allows a mobile terminal to host group activities of participating terminals. Proximity connections, e.g., Bluetooth, and/or OTA connections, e.g., Global System for Mobile Communications (GSM), are used to provide the communications conduit between the hosting mobile terminal and the participating terminals. The hosting mobile terminal guides information flow between itself, the participating terminals, and optionally, a network server that may assist the hosting mobile terminal. The hosting mobile terminal provides group management, profiling, downloading, presence, gaming, payment/charging, and authentication functions either in terminal only mode, or alternatively, in server assisted mode.

Data delivery in group situations is made possible by the present invention, by providing a common interface from which multiple downloads are managed from a mobile platform acting as the common interface. The mobile platform also acts as a content adaptation platform, whereby the capabilities of each member of the group are managed by the mobile platform to enable appropriate content downloads.

Messaging is enhanced, whereby the common interface provides a central repository for the receipt of questions from the group, or alternatively, the common interface may provide a mobile chat room to be used by each member of the mobile group. Presence functions within a mobile group are facilitated, whereby the current location of each member of the group is managed. In a group setting, such as with a group of younger persons, the respective identity and presence information of each group member is easily managed.

Figure 1:
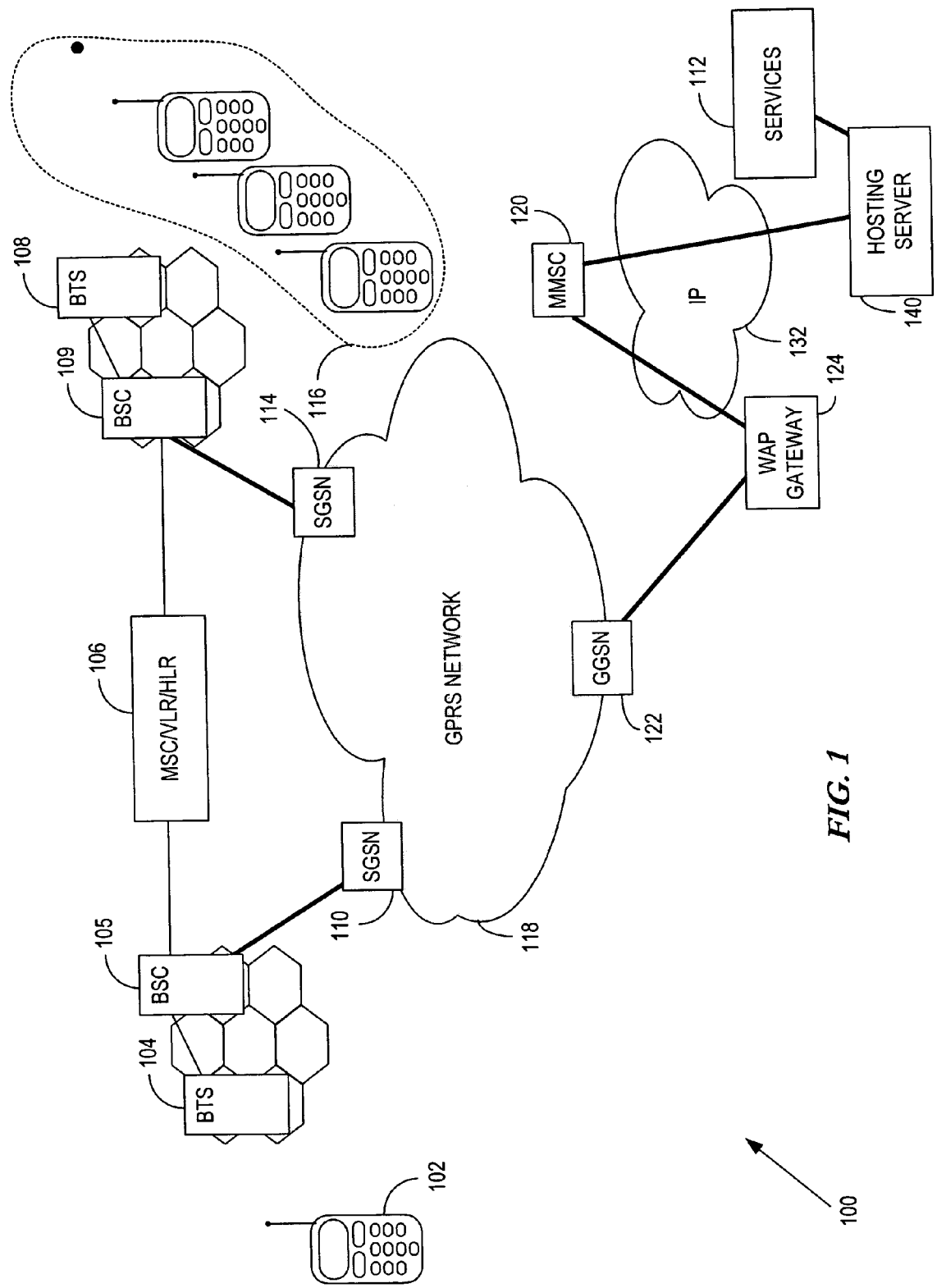
FIG. 1 illustrates a General Packet Radio Service (GPRS) network that may be used in accordance with the present invention.

FIG. 1 illustrates GPRS network 100 that may be used in accordance with the present invention as an Over the Air (OTA) environment to provide a variety of services that is guided or managed by a hosting terminal. GPRS is a packet-switched service for GSM that mirrors the Internet model and enables seamless transition towards 3G (third generation) networks. GPRS thus provides actual packet radio access for mobile GSM and time-division multiple access (TDMA) users, and is ideal for Wireless Application Protocol (WAP) services. While the exemplary embodiments of FIG. 1 are generally described in connection with GPRS/GSM, it should be recognized that the specific references to GSM and GPRS are provided to facilitate an understanding of the invention. As will be readily apparent to those skilled in the art from the description provided herein, the invention is equally applicable to other technologies, including other circuit-switched and packet-switched technologies, Wideband Code Division Multiple Access (WCDMA), 3G technologies, and beyond.

Mobile terminal 102 and participating mobile terminals 116 communicate with Base Transceiver Station (BTS) 104 and 108, respectively, via an air interface. BTS 104 and 108 are components of the wireless network access infrastructure that terminates the air interface over which subscriber traffic is communicated to and from mobile terminals 102 and 116. 105 and 109 are switching modules that provide, among other things, handoff functions, and power level control in each BTS 104 and 108, respectively. BSC 105 and 109 controls the interface between a Mobile Switching Center (MSC) 106 and BTS 104 and 108, and thus controls one or more BTSs in the call set-up functions, signaling, and in the use of radio channels. BSC 105 and 109 also controls the respective interfaces between Serving GPRS Support Node (SGSN) 110 and BTS 104 and SGSN 114 and BTS 108.

SGSN 110 serves a GPRS mobile terminal by sending or receiving packets via a Base Station Subsystem (BSS), and more particularly via BSC 105 and 109 in the context of GSM systems. SGSN 110 and 114 are responsible for the delivery of data packets to and from mobile terminals 102 and 116, respectively, within the service area, and performs packet routing and transfer, mobility management, logical link management, authentication, charging functions, etc. In the exemplary GPRS embodiment shown in FIG. 1, the location register of SGSN 110 stores location information such as the current cell and Visiting Location Register (VLR) associated with mobile terminal 102, as well as user profiles such as the International Mobile Subscriber Identity Number (IMSI) of all GPRS users registered with SGSN 110. SGSN 114 performs similar functions relating to participating mobile terminals 116. SGSN 110 and 114 are ultimately coupled to MMSC 120 in connection with the presently described embodiment. While GSM forms the underlying technology, SGSN 110 and 114 described above are network elements introduced through GPRS technology. Another network element introduced in the GPRS context is the Gateway GPRS Support Node (GGSN) 122, which acts as a gateway between the GPRS network 118 and WAP gateway 124.

MMSC 120 provides messaging capabilities for the delivery of multimedia messages composed of text, photographs, video, and other media types. The messaging capabilities include mobile originated messages sent to other mobile terminals or applications and application originated messages sent to mobile terminals or other applications. MMSC 120 is responsible for storing incoming and outgoing MMS messages, as well as the transfer of messages between different messaging systems. In addition, MMSC 120 may provide a Web Service Interface, e.g., MM7, that allows application developers and service providers to connect to MMSC 120 to offer value added services 112 to participating terminals 116 via hosting terminal 102, such as those services and content offered by hosting server 140 via IP network 132.

Figure 2:
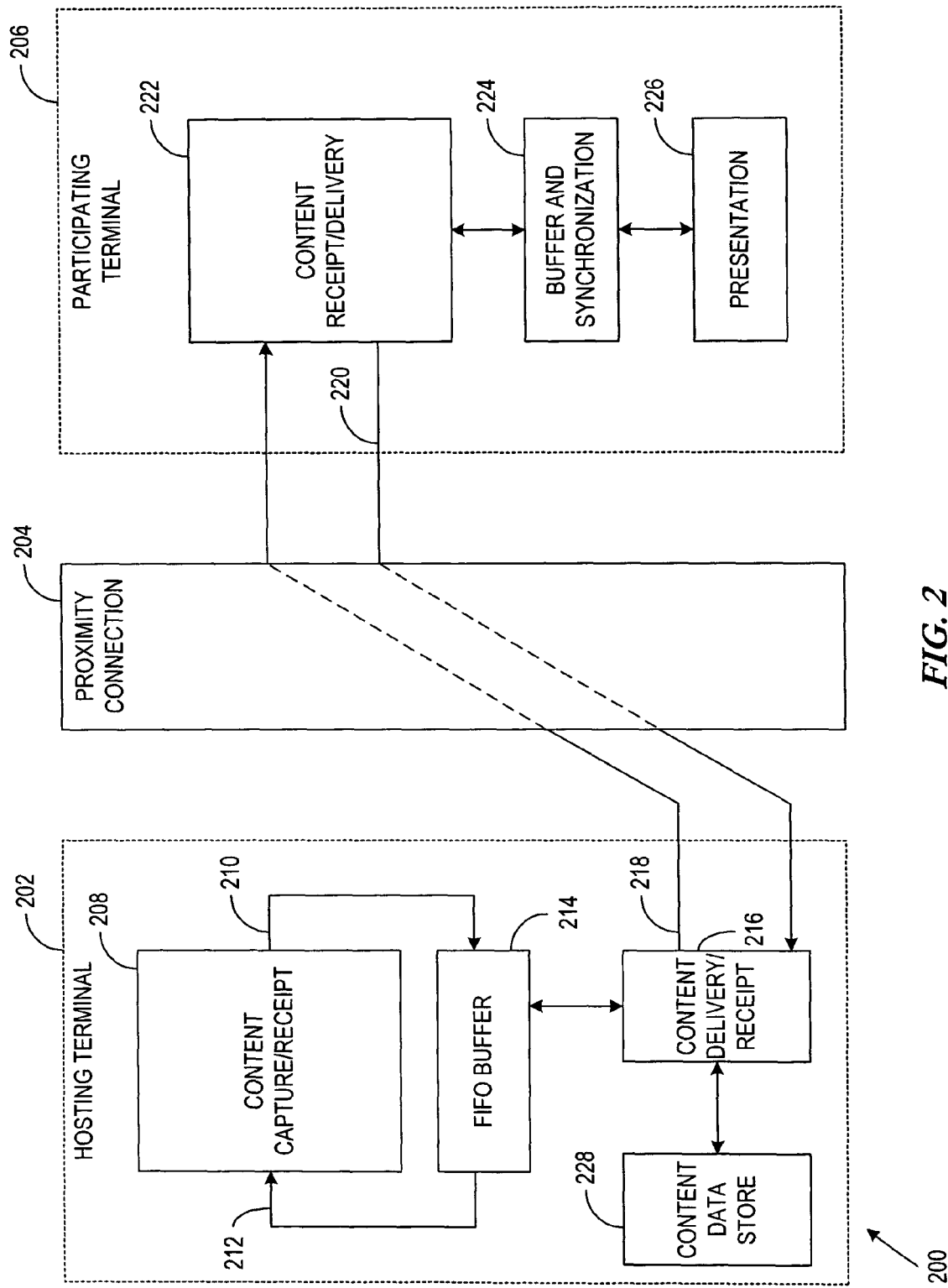
FIG. 2 illustrates a proximity block diagram in accordance with the present invention.

In an alternative embodiment according to the principles of the present invention, a proximity connection may be utilized to provide a variety of services that are guided or managed by a proximately coupled hosting terminal. FIG. 2 illustrates high level block diagram 200 illustrating hosting terminal 202 arranged to transfer data to participating terminal 206 via path 218 and is arranged to receive acknowledgment of the received data via path 220. The nature of the data transfer may be of any type and rate that is supported by proximity connection 204, hosting terminal 202 and participating terminal 206. One of ordinary skill in the art will recognize that any data type may be supported by such an arrangement. The data, for example, may be synchronization data that is transferred by hosting terminal 202 to participating terminal 206, e.g. a mobile terminal, in order to obtain a common data store between the two devices via a data synchronization standard such as SyncML. The synchronization data may support such activities as calendar synchronization, contact synchronization, to-do lists, initial download of special purpose content, etc., as required between the hosting terminal 202 and participating terminal 206 to provide such a common data store. SyncML may also support data types such as images, files and database objects. It should also be noted, that data transfer from participating terminal 206 may also be received by hosting terminal 202. In such an instance, data flow path between participating terminal 206 and hosting terminal 202 is facilitated through path 220, while acknowledgment of the data receipt is provided by path 218.

For purposes of exemplifying the present invention, block diagram 200 is discussed in terms of a content transport mechanism between hosting terminal 202 and participating terminal 206, whereby proximity connection 204 is utilized as the communication conduit between the two devices. Proximity connection 204 may represent a wired and/or a wireless connection. Wired implementations of proximity connection 204 may include single ended data transmission formats such as those specified by the RS232 or RS432 standards, or may include differential data transmission formats such as those specified by the RS422 or RS485 standards. Other wired implementations for higher bandwidth considerations may use the Universal Serial Bus (USB), or FireWire, specifications for example. Wireless implementations of proximity connection 204 may include Wireless Local Area Network (WLAN), Bluetooth, Infrared, etc. as required by the particular application.

In one embodiment according to the present invention, hosting terminal 202 may be an image enabled device having content capture/receipt capability 208. In such an embodiment, hosting terminal may provide audio/video signal feeds to one or more participating terminals 206, where content capture/receipt 208 may provide both audio and video data, whereby images may be presented in still and/or video mode. In still mode, only a single image is transferred via path 210 to First-In First-Out (FIFO) buffer 214, where acknowledgement of the content receipt is generated via path 212. In video mode, multiple images arranged in back to back frame sequence are transferred to FIFO buffer 214 at a rate of, for example, 10-20 Frames per Second (FPS). FIFO buffer 214 buffers the content blocks, while content delivery/receipt 216 prepares for their subsequent transfer to participating terminal 206 via path 218 through proximity connection 204. Other data content, on the other hand, may be provided by hosting terminal 202 from content data store 228. Content data store 228 may provide content previously retrieved from, for example, a content server such as hosting server 140 illustrated in FIG. 1.

Path 220 is used by content receipt/delivery 222 to acknowledge receipt of the content from content delivery 216 via proximity connection 204. Buffer and synchronization block 224 is used to provide the proper frame alignment and playback speed as required by presentation 226. Presentation 226 represents any Application Programming Interface (API) that is executing on participating terminal 206 including content processing software in support group related content consumption activities.

Proximity connection 204 provides the conduit for data transfer between hosting terminal 202 and participating terminal 206. For reasons of exemplification, proximity connection 204 is described in terms of the Bluetooth standard for localized data transfer. Bluetooth technology is an industry standard for short-range wireless voice and data communications, allowing a single air interface to support local communications for distances of up to 10-20 meters.

Hosting terminal 202 may be implemented using a Series 60 Platform, for example, that is built upon the Symbian Operating System (OS) General Technology (GT). Symbian GT provides a fully object-oriented design, preemptive multi-tasking, and full support for client-server architecture. Symbian GT also provides the common core for API and technology, which is shared between all Symbian reference designs. Some of the major components supported by Symbian GT include a multimedia server for audio recording, playback, and image-related functionality, as well as a Personal Area Network (PAN) communication stack including infrared, Bluetooth and serial communications support. As such, Symbian GT allows the use of Bluetooth technology to allow proximity, wireless operations to utilize local service accessories. The number and type of local service accessories provided by the Bluetooth connection are virtually unlimited and they include for example; bar code readers, digital pens, health monitoring devices, Global Positioning System (GPS) receivers, enhanced video feeds, video conferencing facilitation, and support of group hosting activities to enable group based browsing, data delivery, messaging, content adaptation, presence, etc.

Figure 3:
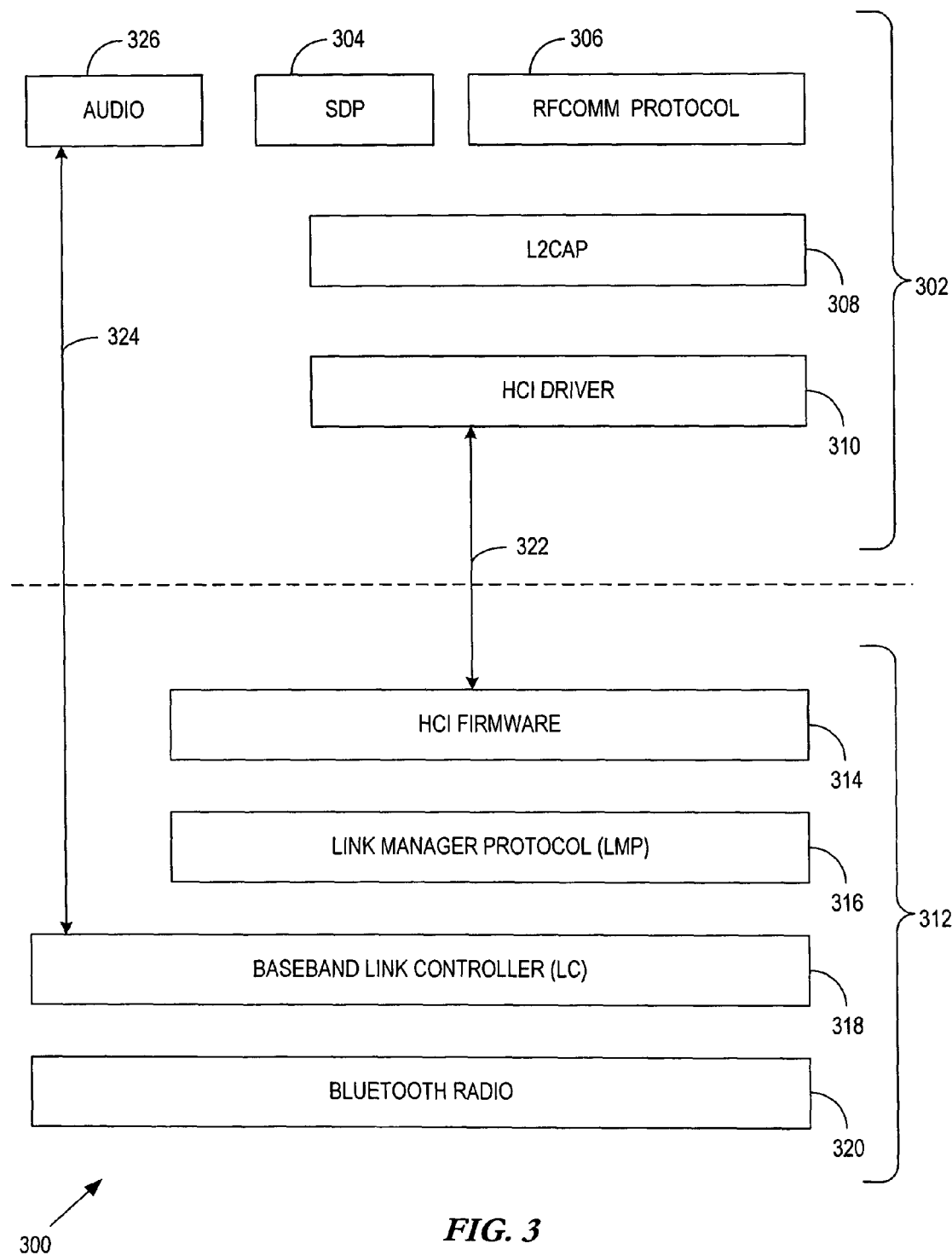
FIG. 3 illustrates a Bluetooth stack hierarchy.

Like many other communication technologies, Bluetooth is composed of a hierarchy of components that is exemplified in Bluetooth stack hierarchy 300 shown in FIG. 3. The Bluetooth communication stack may be broken into two main components. The first component, Bluetooth Host Controller (BTHC) 312, provides the lower level of the stack. BTHC 312 is generally implemented in hardware and allows the upper level stack, Bluetooth Host (BTH) 302, to send or receive data over a Bluetooth link and to configure the Bluetooth link. Configuration and data transfer between BTHC 312 and BTH 302 takes place via path 322, which connects Host Controller Interface (HCI) driver 310 with HCI firmware module 312.

Bluetooth operates in the 2.4 gigahertz (GHz) Industrial, Scientific, and Medical (ISM) band. It uses a fast frequency hopping scheme with 79 frequency channels, each being 1 MHz wide. Bluetooth Radio (BTR) 320 is designed to provide a low-cost, 64 kbps, full-duplex connection that exhibits low power consumption. Power consumption on the order of 10-30 milliamps (mA) is typical, where even lower power consumption exists during idle periods.

Baseband link controller (LC) 318 defines different packet types to be used for both synchronous and asynchronous transmission. Packet types supporting different error handling techniques, e.g., error correction/detection, and encryption, are also defined within LC 318. LC 318 also mitigates any Direct Current (DC) offsets provided by BTR 320 due to special payload characteristics. Link Manager Protocol (LMP) 316 is responsible for controlling the connections of a device, like connection establishment, link detachment, security management, e.g., authentication, encryption, and power management of various low power modes.

BTH 302 illustrates the upper level of a Bluetooth stack and is comprised primarily of software applications 304-310, and 326. HCI driver 310 packages the high level components that communicate with the lower level hardware components found in BTHC 312. Logical Link Control and Adaptation Protocol (L2CAP) 308 allows finer grain control of the radio link. For example, L2CAP 308 controls how multiple users of the link are multiplexed together, controls packet segmentation and reassembly, and conveys quality of service information.

Service Discovery Protocol (SDP) 304 and Radio Frequency Communication (RFCOMM) protocol 306 represent middleware protocols of the Bluetooth stack. RFCOMM protocol 306 allows applications communicating with Bluetooth stack 300 to treat a Bluetooth enabled device as if it were a serial communications device, in order to support legacy protocols. RFCOMM protocol 306 defines a virtual set of serial port applications, which allows RFCOMM protocol 306 to replace cable enabled communications. The definition of RFCOMM protocol 306 incorporates major parts of the European Telecommunication Standards Institute (ETSI) TS 07.10 standard, which defines multiplexed serial communication over a single serial link. Service Discovery Protocol (SDP) 304 is used to locate and describe services provided by or available through another Bluetooth device. SDP 304 plays an important role in managing Bluetooth devices in a Bluetooth environment by allowing discovery and service description of services offered within the environment. Audio block 326 represents another middleware component of stack 300 that allows Bluetooth to offer audio and telephony support. The audio portion of Bluetooth data may be transferred directly from LC 318 to audio block 326 via path 324, thereby bypassing the LMP 316, HCI 310 and 314, and the L2CAP 308 layers.

The Bluetooth communication stack of FIG. 3 represents the lower communication layers that support any number of higher level application embodiments according to the present invention. Returning to FIG. 2, for example, hosting terminal 202 and participating terminal 206 may each employ Bluetooth communication stack 300, in order to facilitate a socket based data transfer via Bluetooth proximity connection 204.

Prior to socket connection, however, service discovery must be performed in order to identify potential Bluetooth enabled devices for subsequent connection. SDP 304 performs this task by performing two main functions: discovery of devices and services within the local area, and the advertisement of services from the local device. If, for example, a Bluetooth enabled device can provide a group hosting function, then that group hosting service is made visible through SDP 304 to other Bluetooth enabled devices that may be interested in that functionality.

In order for a Bluetooth service to be advertised, it must first be represented by a service record and kept within an SDP database for access by other applications. The SDP database is implemented as a server within the Symbian OS and as such, other applications wishing to discover the services offered, must first establish a connection to the server and open a session on the server. The RSdp class within the Symbian OS API represents the SDP database server and allows an application to connect to it.

A service record in Symbian OS is created through the SDP database by managing a collection of service handles and their associated attributes that make up the service record. Each service record is identified by a Universally Unique Identifier (UUID), which is defined within the <bttypes.h> header file. Within each service record exists a service class and associated profile that are used to help generalize the types of service provided by the device. There are, for example, predefined service class numbers that may represent a Bluetooth enabled mobile terminal and a more specific entry to define that the Bluetooth enabled mobile terminal also has the ability to offer a variety of services, whereby the services are managed by the hosting mobile terminal. In general, therefore, the service record contains a collection of attributes that are identified by an identification number that is of the TSdpAttributeID data type defined within the <btsdp.h> header file. Each service handle and the associated attributes are used by the SDP database to identify attributes and their values within the database.

The Symbian OS API provides SDP 304 with service search patterns and attributes search patterns that are used to facilitate the device and service discovery process. The service search pattern, for example, allows SDP 304 to discover and create a list of all available services within the local area, where all services discovered in the local area are services that are advertised by their own SDP agent and identified by their respective service record UUIDs. The attribute search pattern allows the creation of a list of attribute IDs from a remote SDP database. Additionally, the attribute search pattern allows the searching device to create an attribute range that defines a list of attributes that are of interest to the searching device. Accordingly, attribute queries result in only those attributes of the remote Bluetooth enabled devices that fall within the attribute range specified in attribute search pattern.

Once a device with a suitable service has been identified, a client application generally queries the service for more information, which may include requesting the available attributes of the identified service. There are generally two ways that a client may search for devices. First, a client application may manually issue a query to all devices within a range and handle each response in turn. Alternatively, the client may use the Bluetooth Device Selection User Interface (DSUI), which automatically issues queries, handles the responses, and prompts the user with a dialog box. The dialog box enables the user the ability to select the device that he wishes to use. The DSUI operates in conjunction with the RNotifier class supplied within the Symbian OS API.

Figure 4:
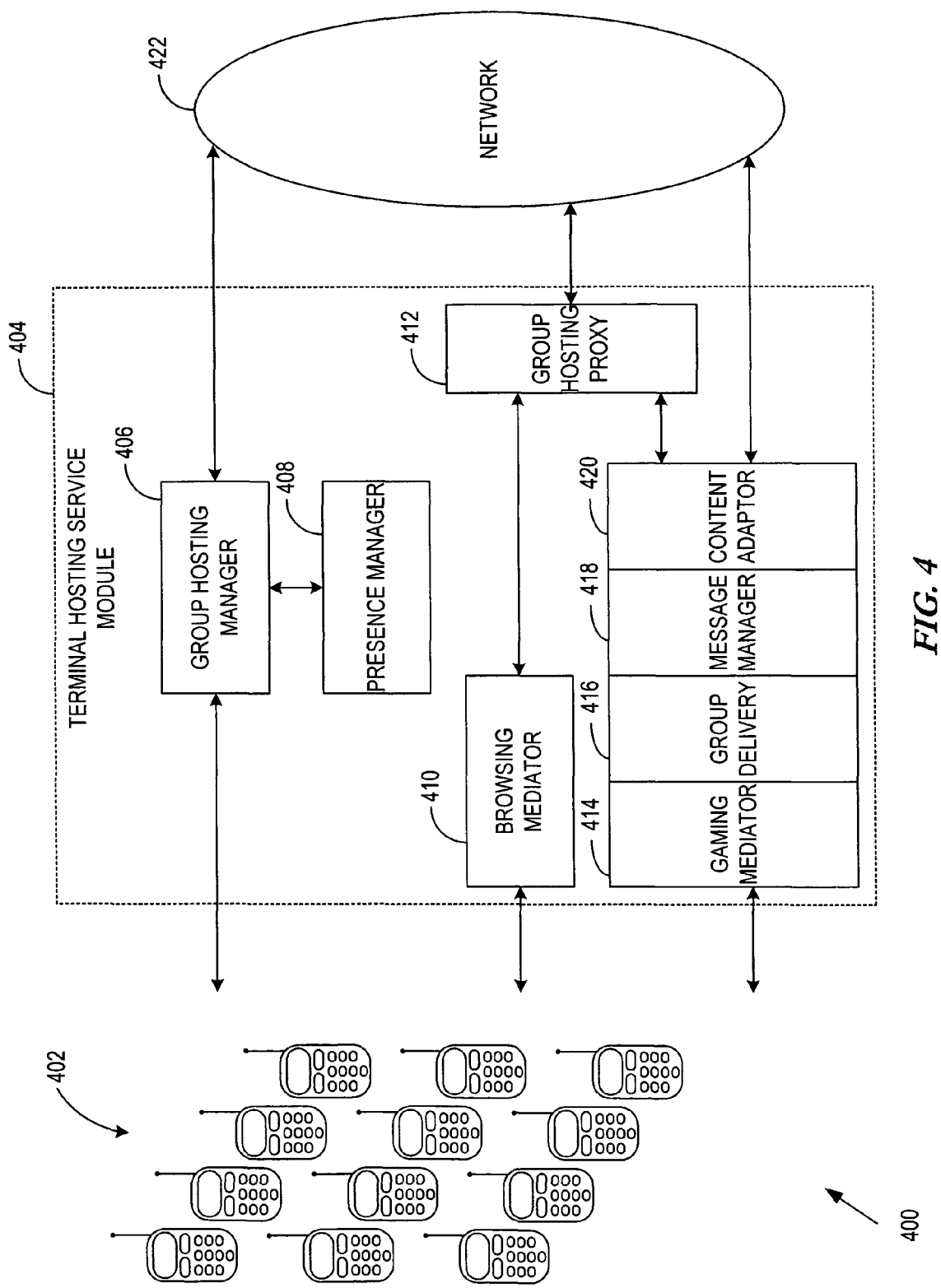
FIG. 4 illustrates group hosting block diagram in accordance with the present invention.

Such a service may be offered by a Bluetooth enabled, group hosting mobile terminal executing Terminal Hosting Service Module (THSM) 404 of FIG. 4. The group hosting mobile terminal according to the present invention is capable of terminal only hosting, or alternately, facilitating server assisted group hosting, as exemplified by group hosting block diagram 400 of FIG. 4. Terminal Hosting Service Module (THSM) 404 may be executing within the Symbian based mobile terminal as discussed above. Communications with participating terminals 402 may be conducted via proximity connection 204 as illustrated in FIG. 2, whereby Bluetooth communications are enabled in accordance with Bluetooth communications stack 300 of FIG. 3. Server assisted group hosting may be facilitated through connections to network 422, whereby hosting server 140 and services 112, for example, of FIG. 1 may be accessed.

Group hosting manager 406 facilitates the management of group services offered through proximity connections to participating terminals 402, whereby THSM 404 acts as the hosting terminal to host ad hoc or permanent groups such as participating terminals 402. The groups may be formed through service discovery mechanisms offered by SDP 304 of Bluetooth stack 300 as discussed above in relation to FIG. 3. Each of participating terminals 402, for example, may each have Bluetooth service discovery mechanisms that are capable of discovering the group hosting function offered by THSM 404 as managed by group hosting manager 406. In particular, the users of participating terminals 402 may utilize the Bluetooth DSUI to discover the group hosting service offered by group hosting manager 406 and subsequently connect to THSM 404 to take advantage of services 414-420, and/or other services offered by network 422.

In order to illustrate an exemplary application of the present invention, a group hosting scenario is now presented in relation to guided tours. A guided tour generally consists of a tour guide who facilitates the tour of, for example, a museum, where the tour guide is able to provide value added information to enhance the participant's appreciation of the treasures contained within the museum. Generally, information that is memorized by the tour guide is presented to the participants and the participants are able to ask questions of the tour guide in order to augment their understanding. The present invention enables mobile terminal enabled group hosting to enhance the tour participants' experience.

In particular, the tour guide having possession of a hosting mobile terminal that is executing THSM 404, may provide browsing mediator 410 to allow participants 402 to access additional museum information. In one embodiment according to the present invention, additional museum information may be pre-composed and contained within the hosting mobile terminal for future transfer to participating terminal 402, whereby the requested museum information may then be adapted using content adaptor 420 according to the requesting terminal's capabilities. A capabilities exchange, for example, may have occurred during a participating terminal's initial request to join the tour group, where the capabilities exchange may illuminate participating terminal's capabilities such as display size, display resolution, memory allocation, etc. If the requested museum information, for example, contains graphical content whose resolution requires a video display that exceeds the capacity of participating terminals 402, then content adaptation performed by content adaptor 420 may reduce the resolution of the graphical image, thus reducing the size of the image and allowing participating terminals 402 to receive the image in its lower resolution form. Once the content has been adapted, then group delivery 416 may commence the adapted content download to the requesting terminal.

In another embodiment according to the present invention, browsing mediator 410 may allow access to network 422 via group hosting proxy 412 to implement a server assisted group hosting function. In such a function, a Uniform Resource Locator (URL) may be provided to network 422 via browsing mediator 410 that contains the address to, for example, eXtensible HyperText Markup Language (XHTML) content pertaining to the museum being toured. Once the content has been retrieved from network 422, then content adaptation and content delivery may be performed via content adaptor 420 and group delivery 416 as discussed above and subsequently delivered to the appropriate participating terminals.

In either embodiment, downloading of data may be facilitated by THSM 404 during the tour to enhance participants' 402 experience. For example, participants 402 may download screen saver software that pertains to the museum being toured. Alternately, custom User Interfaces (UI) having, for example, a Rembrandt theme may be downloaded to the participant's terminal. Still further, the participant's experience may be further enhanced by the download of a game pertaining to the museum via gaming mediator 414. In this case, a portion of a game, but not the gaming executable itself, is downloaded by gaming mediator 414 so that participating terminals 402 may interact with THSM 404 in a hosted gaming session. Participants 402 may, for example, play a quiz game pertaining to the museum being toured, such that door prizes may be awarded to the participant having the highest percentage of correct answers to questions pertaining to material previously covered by the tour guide.

Messaging between participants 402 may also be enhanced through the use of message manager 418. In particular, participants are able to submit questions to the tour guide during the tour, so that they may be later answered. Alternately, THSM 404 may host a chat room, whereby two or more participants 402 may conduct public or private chat sessions during the museum tour. In this case, participants may exchange thoughts and other communication during the guided tour, even when voice communication is discouraged, e.g., during the time when the tour guide is providing voice communication to the other tour participants.

Personalization of participants 402 may be enhanced by THSM 404 by accessing profile information stored within a profile server (not shown) within network 422. Additionally, presence information in relation to participants 402 may be managed by presence manager 408. Presence information may prove especially important when, for example, participants of the guided tour are elementary school aged children and their location and presence needs to be updated frequently by the tour guide. Presence information about one or more participants 402 from presence manager 408 may also be shared with other participants 402. Such would be the case when chaperones, who comprise a subset of participants 402, require presence information about the younger participants 402 whom they are responsible for.

Figure 5:
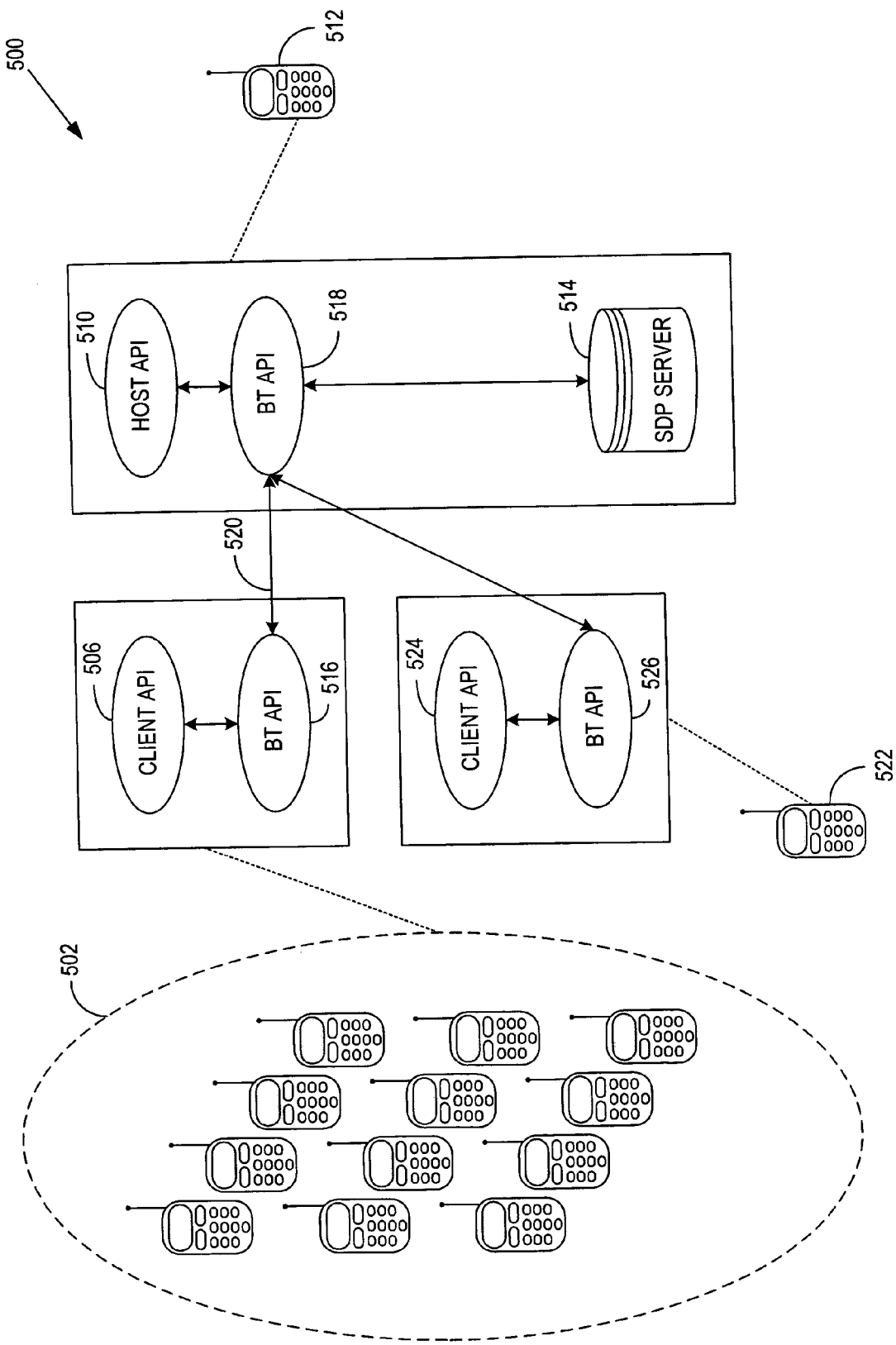
FIG. 5 illustrates a Bluetooth enabled group hosting block diagram in accordance with the present invention.

Group hosting block diagram 500 of FIG. 5 illustrates the flexibility of the present invention, whereby group sessions are established using, for example, Bluetooth functionality in combination with the respective client and host Application Programming Interfaces (APIs). Host terminal 512 executes host API 510, as exemplified by THSM 404 of FIG. 4, that consists of a hosting application responsible for obtaining a list of participants, e.g., 502, who require access to the particular hosting application offered by host terminal 512. The services offered by host terminal 512 are publicized by SDP server 514 and they are offered to any compatible Bluetooth device that is capable of connecting to them.

In order to operate as a server, however, any application, e.g., client API 506, wishing to access the services offered by SDP server 514 are first required to establish Bluetooth connection 520 to open a session on SDP server 514. The session is facilitated by Bluetooth (BT) API 516 and BT API 518 executing on participating terminal 502 and hosting terminal 512, respectively. SDP server 514 creates and manages a set of services and their associated handles to which requesting clients may connect. SDP server 514 populates attributes that are associated with the service provided, such as a list of protocols that the service will adhere to and then advertises their use to any requesting client.

The steps taken by participating terminals 502 to connect to host API 510 are as follows. Participating terminals 502 must first search for Bluetooth devices that may be available in the local piconet. Once a list of available Bluetooth devices has been generated, participating terminals 502 will search the Bluetooth devices, e.g., host terminal 512, for the services they desire, e.g., host API 510. Selection of host API 510 may be implemented through the use of a DSUI executing within BT API 516, which automatically issues the Bluetooth device query, handles all responses, and provides the user with a dialog box for user selection. Additionally, the DSUI may query SDP server 514 for the available attributes associated with the services offered by host terminal 512. The user of participating terminals 502 need only select host terminal 512 using the DSUI to establish a hosting session with host terminal 512.

As each participating terminal 502 requests a hosting session with host terminal 502, host API 510 adds the requesting terminal to a list of participating terminals for the current session. The list created by host API 510 is a flexible list that may be added to or subtracted from at any time. For example, mobile terminal 522, while not being a part of the original group of participating terminals 502, may nevertheless establish a connection with host terminal 512 via client API 524 and associated BT API 526 in order to become a part of the group session comprising participating terminals 502 and host terminal 512. Alternately, any one or more of participating terminals 502 may discontinue its session with host terminal 512 at any time. Host API 510, in addition to tracking all participating terminals also provides support for browsing, downloading, payment/charging information, messaging, presence, content adaptation, gaming, and personalization/profiling as discussed in relation to FIG. 4.

Figure 6:
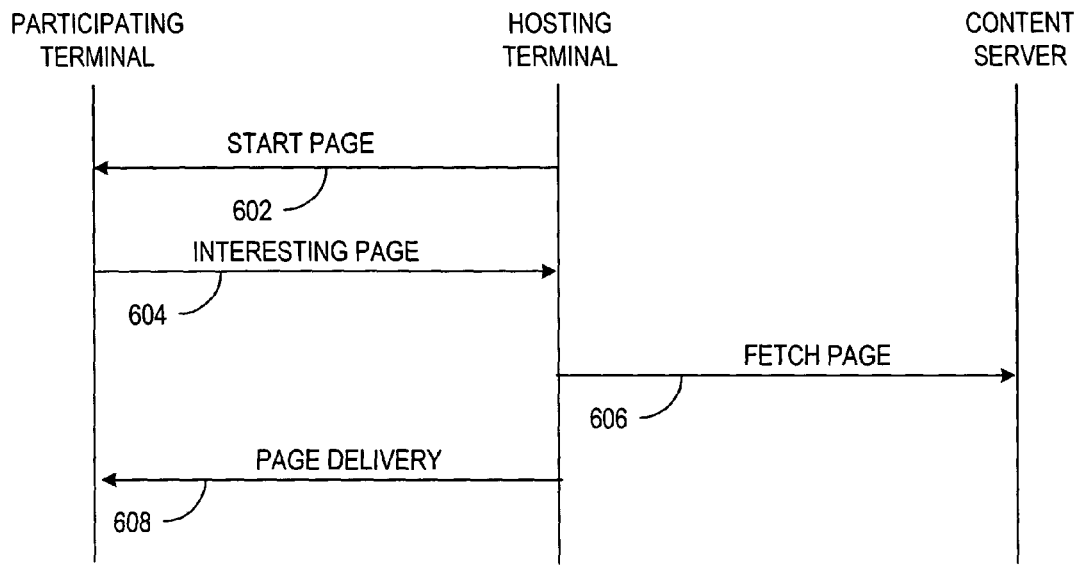
FIGS. 6-11 illustrate exemplary message flows in accordance with the present invention.

Generally, the hosting terminal may facilitate terminal only, or server assisted, group hosting functions in accordance with the present invention. Message flow diagram 600 of FIG. 6 illustrates an exemplary message flow in which the hosting terminal acts as a group hosting proxy and is explained with regard to FIGS. 4 and 5. Once the host session has been set up as illustrated in FIG. 5, for example, the hosting terminal's browsing mediator transmits a starting URL via message 602 to a participating terminal that points to HyperText Markup Language (HTML)/XHTML content contained within the hosting terminal. During the browsing session, an interesting link is found by the participating terminal and subsequently selected in message 604. Since the requested link does not exist within the hosting terminal, group hosting proxy 412 of FIG. 4 forwards the URL to the appropriate content server within network 422, fetches the content supplied by the content server via message 606, and delivers the content to the participating terminal in message 608.

Figure 7:
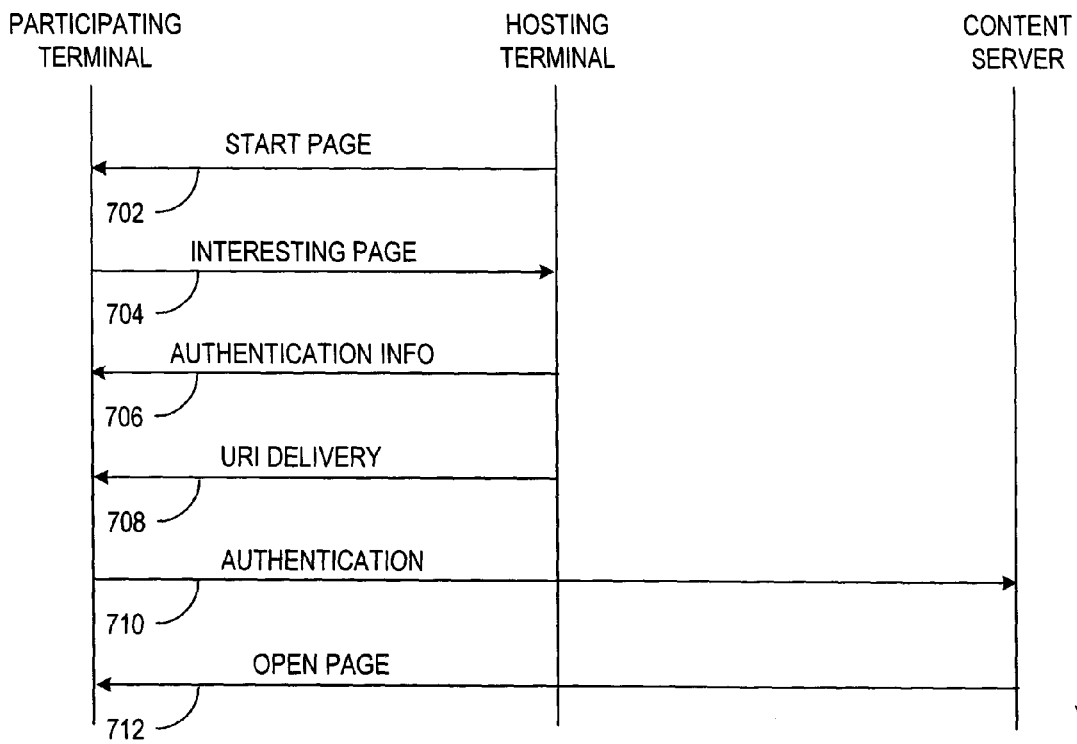

In an alternate embodiment, the starting URL and interesting link are communicated between the participating terminal and the hosting terminal via messages 702 and 704, respectively, as shown in message flow 700 of FIG. 7. In message 706, however, the Bluetooth security manager within BT API 518 of hosting terminal 512 exchanges authorization, authentication, and encryption keys with the participating terminal. Once the participating terminal has been authenticated, the appropriate Uniform Resource Identifier (URI) is transmitted via message 708 to the participating terminal. The participating terminal then requests access to the content server via authentication message 710, in which the participating terminal transmits its security credentials. Once authenticated, participating terminal accesses the markup content from the content server via message 712.

Figure 8:
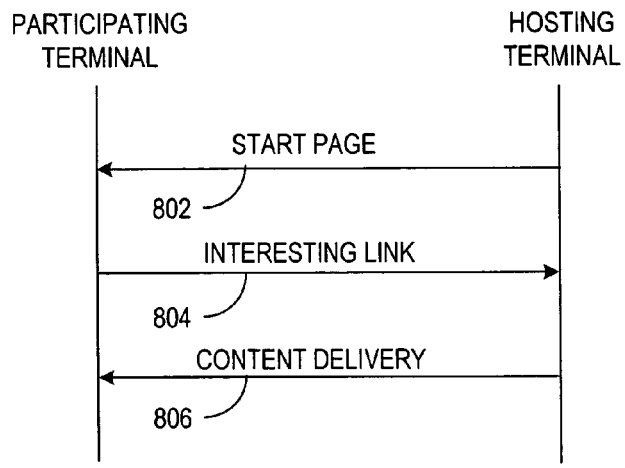

In an alternate embodiment according to the present invention, message flow 800 of FIG. 8 illustrates an exemplary terminal only hosted session. In message 802, the participating terminal receives a starting URL, and subsequently requests interesting content in message 804. In such a case, the participating terminal may be invited, for example, to download the latest screen saver associated with the museum being toured via message 806. The hosting terminal may already have the software associated with the screen saver, which is stored within content data store 228 of FIG. 2. The data may then be directly provided by the hosting terminal to the participating terminal without content server intervention.

Generally, the hosting terminal may provide any data or software in accordance with FIG. 8 to promote enhanced data sharing with hosted groups without the need for content server assistance. For example, a hosted gaming session may be managed via gaming mediator 414 of FIG. 4 of the hosting terminal, whereby the game executable is not downloaded to the participating terminals. Rather, only portions of the gaming session that are needed, e.g., gaming demos, are downloaded to the participating terminal. Messaging may also be supported by the hosting terminal without the need for server assistance, where questions may be transmitted to message manager 418 of FIG. 4 by the participating terminals to the hosting terminal during the guided tour. Alternately, the hosting terminal may provide a URL to a chat room within message manager 418 that is accessible only by the participating terminals of the group, whereby conversations between the participants may be conducted during the tour without interrupting the tour guide's presentation.

Figure 9:
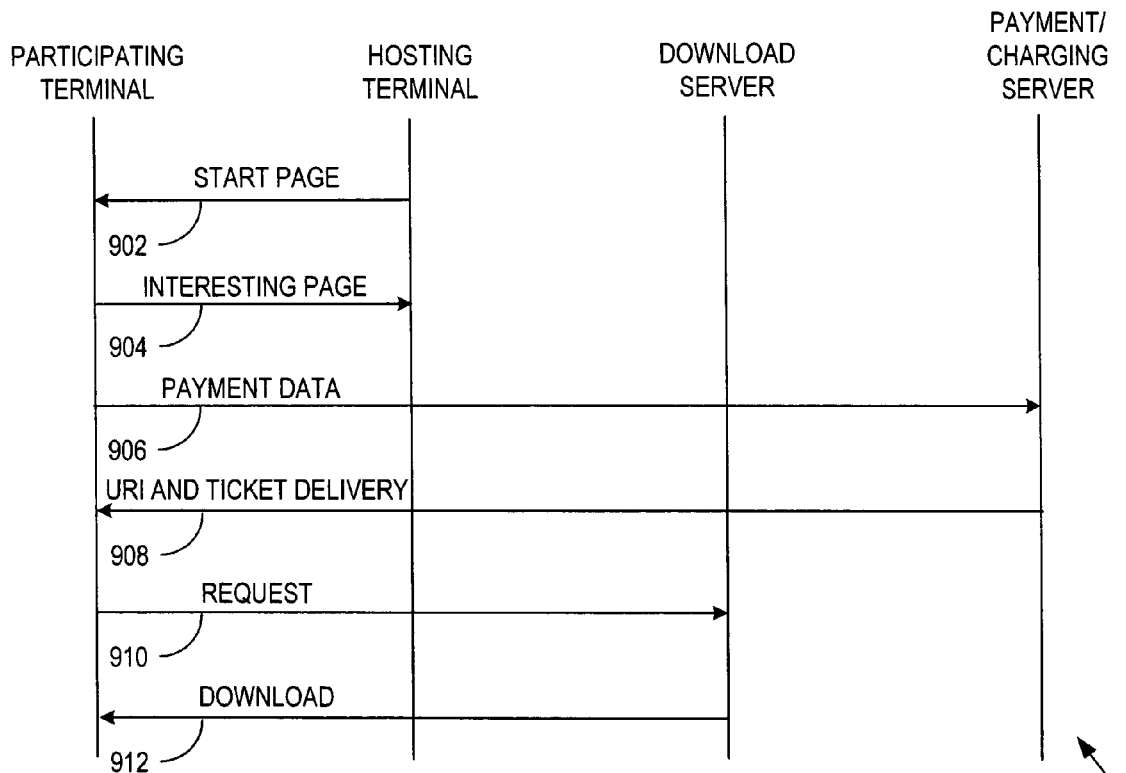

In an alternate embodiment according to the present information, a download server as well as a charging/payment server may be utilized in server assisted group hosting scenario 900 of FIG. 9. Message flows 902 and 904 are the initial URL and requested link messages from hosting terminal and participating terminal, respectively. The content requested, however, requires payment information, e.g., credit card number, from the participating terminal which is sent in message 906 to the appropriate payment/charging server. The appropriate URI and proof of purchase, e.g., receipt ticket, are then transmitted via message 908. The participating terminal then requests the purchased download from the appropriate download server in message 910, which is subsequently downloaded via message 912.

Figure 10:
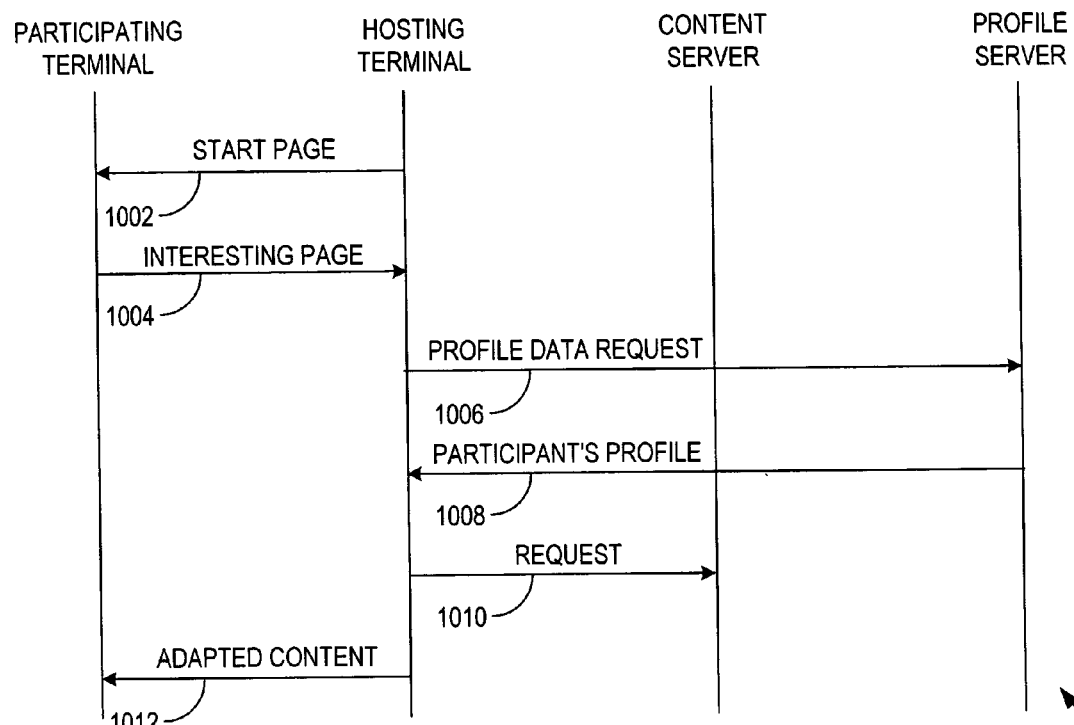

In an alternate embodiment according to the present information, a content server as well as a profile server may be utilized in server assisted group hosting scenario 1000 of FIG. 10. Message flows 1002 and 1004 are the initial URL and requested link messages from hosting terminal and participating terminal, respectively. The content requested, however, requires profile information, e.g., display resolution of the participating terminal, from the profile server for the participating terminal, which is sent in message 1006 to the appropriate profile server. The requested profile information is then transmitted via message 1008. The hosting terminal then requests the data download from the appropriate content server in message 1010. The content received is then adapted by content adaptor 420 of FIG. 4 and forwarded onto the participating terminal in message 1012.

Figure 11:
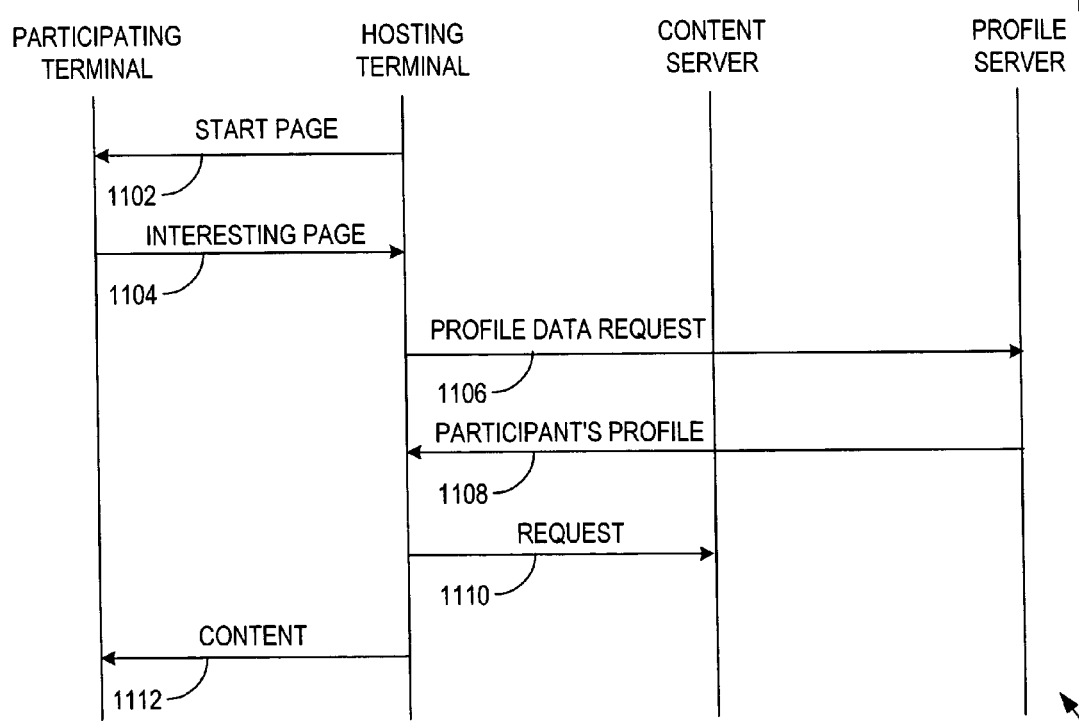

In an alternate embodiment according to the present information, a content server and a profile server may be utilized to download pre-adapted content in server assisted, group hosting scenario 100 of FIG. 11. Message flows 1102 and 1104 are the initial URL and requested link messages from hosting terminal and participating terminal, respectively. The content requested, however, requires profile information, e.g., display resolution of the participating terminal, from the profile server for the participating terminal, which is sent in message 1106 to the appropriate profile server. The requested profile information is then transmitted via message 1108. The hosting terminal then requests the data download from the appropriate content server in message 1110, whereby the content server downloads adapted content to the hosting terminal in accordance with the participating terminal's profile information. The adapted content is then received and forwarded onto the participating terminal in message 1112.

It should be noted that although proximity connections between the participating terminals and the hosting terminal have been used for illustration, non-proximity connections between the participating terminals and the hosting terminal may also be used as understood by those of ordinary skill in the art. WAP push/pull architectures, for example, may be implemented through utilization of GPRS network 100 of FIG. 1 to provide the mechanisms for group hosted operation, whereby hosting terminal, e.g., 102, establishes server assisted operations with hosting server 140. Alternatively, terminal only hosted operations between hosting terminal 102 and participating terminals 116 may be established using GSM protocols as understood by those of ordinary skill in the art. Such OTA group hosting activity may be useful, for example, when arranging an adventure event for a group of participants, or for different kinds of outdoor events.

Figure 12:
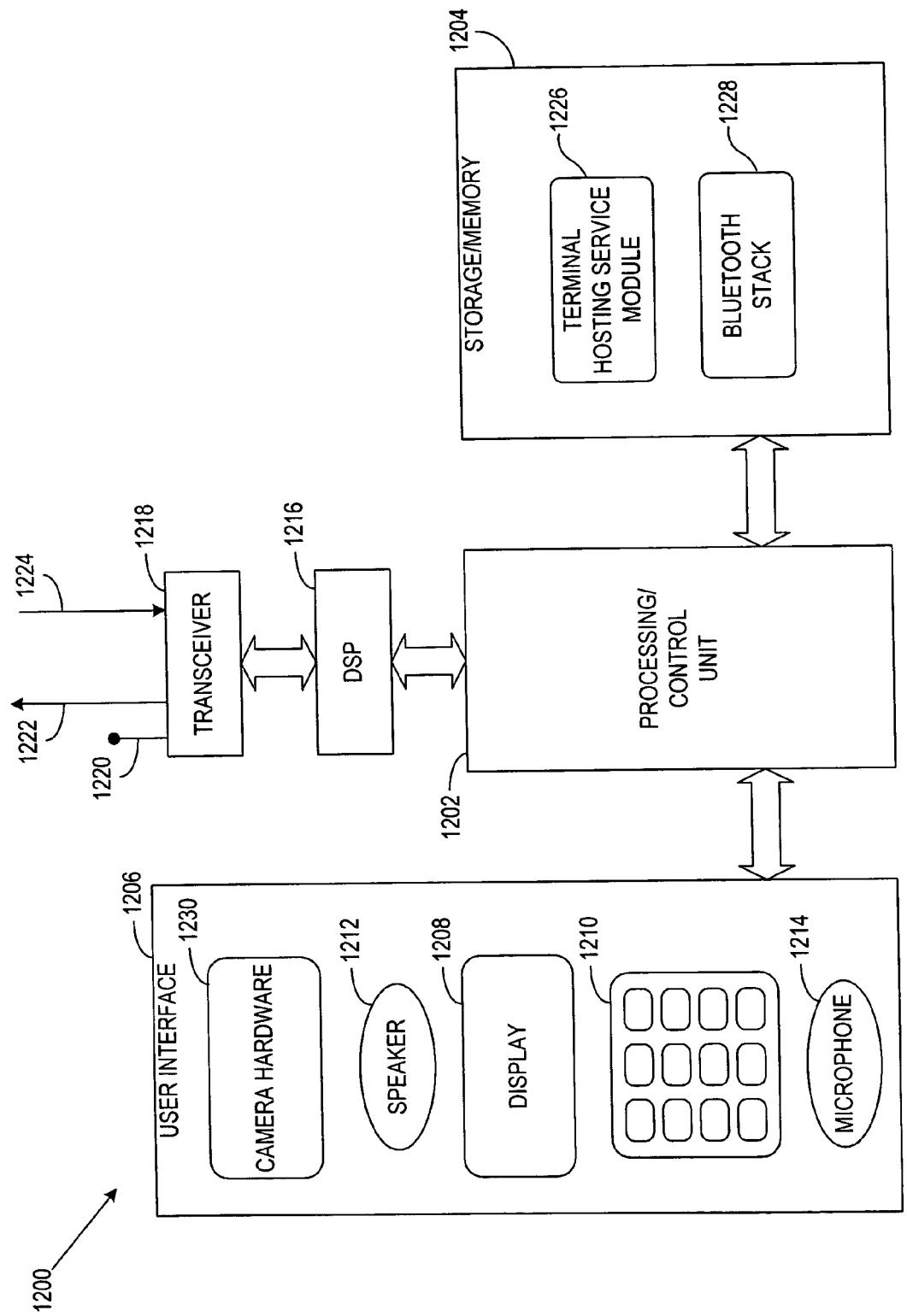
FIG. 12 illustrates a representative mobile computing arrangement suitable for providing group hosting functionality in accordance with the present invention.

The invention is a modular invention, whereby processing functions within either a mobile terminal or a hardware platform may be utilized to implement the present invention. The mobile terminals may be any type of wireless device, such as wireless/cellular telephones, personal digital assistants (PDAs), or other wireless handsets, as well as portable computing devices capable of wireless communication. These landline and mobile devices utilize computing circuitry and software to control and manage the conventional device activity as well as the functionality provided by the present invention. Hardware, firmware, software or a combination thereof may be used to perform the various group hosting functions described herein. An example of a representative mobile terminal computing system capable of carrying out operations in accordance with the invention is illustrated in FIG. 12. Those skilled in the art will appreciate that the exemplary mobile computing environment 1200 is merely representative of general functions that may be associated with such mobile devices, and also that landline computing systems similarly include computing circuitry to perform such operations.

The exemplary mobile computing arrangement 1200 suitable for group hosting functions in accordance with the present invention may be associated with a number of different types of wireless devices. The representative mobile computing arrangement 1200 includes a processing/control unit 1202, such as a microprocessor, reduced instruction set computer (RISC), or other central processing module. The processing unit 1202 need not be a single device, and may include one or more processors. For example, the processing unit may include a master processor and associated slave processors coupled to communicate with the master processor.

The processing unit 1202 controls the basic functions of the mobile terminal, and also those functions associated with the present invention as dictated by terminal hosting service module 1226 and Bluetooth stack 1228 available in the program storage/memory 1204. Thus, the processing unit 1202 is capable of initiating proximity/OTA connection functions associated with the present invention, whereby group hosting activities may be initiated by terminal hosting service module 1226 for subsequent transmission via, for example, Bluetooth stack 1228. The program storage/memory 1204 may also include an operating system and program modules for carrying out functions and applications on the mobile terminal. For example, the program storage may include one or more of read-only memory (ROM), flash ROM, programmable and/or erasable ROM, random access memory (RAM), subscriber interface module (SIM), wireless interface module (WIM), smart card, or other removable memory device, etc.

In one embodiment of the invention, the program modules associated with the storage/memory 1204 are stored in non-volatile electrically-erasable, programmable ROM (EEPROM), flash ROM, etc. so that the information is not lost upon power down of the mobile terminal. The relevant software for carrying out conventional mobile terminal operations and operations in accordance with the present invention may also be transmitted to the mobile computing arrangement 1200 via data signals, such as being downloaded electronically via one or more networks, such as the Internet and an intermediate wireless network(s).

The processor 1202 is also coupled to user-interface 1206 elements associated with the mobile terminal. The user-interface 1206 of the mobile terminal may include, for example, a display 1208 such as a liquid crystal display, a keypad 1210, speaker 1212, camera hardware 1230, and microphone 1214. These and other user-interface components are coupled to the processor 1202 as is known in the art. Other user-interface mechanisms may be employed, such as voice commands, switches, touch pad/screen, graphical user interface using a pointing device, trackball, joystick, or any other user interface mechanism.

The mobile computing arrangement 1200 also includes conventional circuitry for performing wireless transmissions. A digital signal processor (DSP) 1216 may be employed to perform a variety of functions, including analog-to-digital (A/D) conversion, digital-to-analog (D/A) conversion, speech coding/decoding, encryption/decryption, error detection and correction, bit stream translation, filtering, etc. The transceiver 1218, generally coupled to an antenna 1220, transmits the outgoing radio signals 1222 and receives the incoming radio signals 1224 associated with the wireless device.

The mobile computing arrangement 1200 of FIG. 12 is provided as a representative example of a computing environment in which the principles of the present invention may be applied. From the description provided herein, those skilled in the art will appreciate that the present invention is equally applicable in a variety of other currently known and future mobile and landline computing environments. For example, desktop computing devices similarly include a processor, memory, a user interface, and data communication circuitry. Thus, the present invention is applicable in any known computing structure where data may be communicated via a network.

Using the description provided herein, the invention may be implemented as a machine, process, or article of manufacture by using standard programming and/or engineering techniques to produce programming software, firmware, hardware or any combination thereof. Any resulting program(s), having computer-readable program code, may be embodied on one or more computer-usable media, such as disks, optical disks, removable memory devices, semiconductor memories such as RAM, ROM, PROMS, etc. Articles of manufacture encompassing code to carry out functions associated with the present invention are intended to encompass a computer program that exists permanently or temporarily on any computer-usable medium or in any transmitting medium which transmits such a program. Transmitting mediums include, but are not limited to, transmissions via wireless/radio wave communication networks, the Internet, intranets, telephone/modem-based network communication, hard-wired/cabled communication network, satellite communication, and other stationary or mobile network systems/communication links. From the description provided herein, those skilled in the art will be readily able to combine software created as described with appropriate general purpose or special purpose computer hardware to create group hosting system, method, and apparatus in accordance with the present invention.

Figure 13:
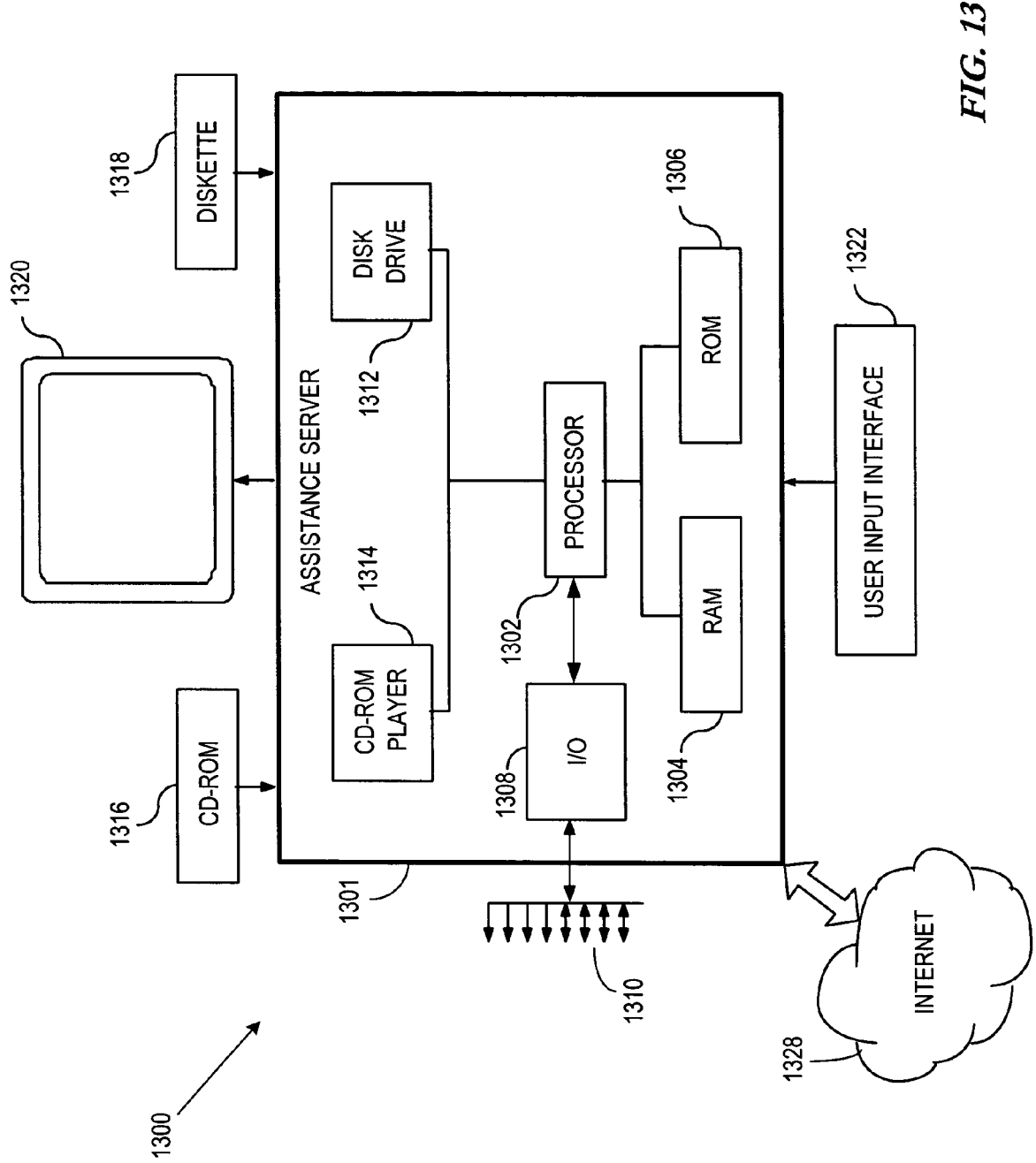
FIG. 13 is a representative computing system capable of carrying out server assisted functions according to the present invention.

The assistance servers or other systems for providing server functions in connection with the present invention may be any type of computing device capable of processing and communicating digital information. The server platforms utilize computing systems to control and manage the group hosting assistance activity. An example of a representative computing system capable of carrying out operations in accordance with the invention is illustrated in FIG. 13. Hardware, firmware, software or a combination thereof may be used to perform the various assistance functions and operations described herein. The computing structure 1300 of FIG. 13 is an example computing structure that can be used in connection with such an assistance server platform.

The example computing arrangement 1300 suitable for performing the assistance activity in accordance with the present invention includes terminal hosted group assistance server 1301, which includes a central processor (CPU) 1302 coupled to random access memory (RAM) 1304 and read-only memory (ROM) 1306. The ROM 1306 may also be other types of storage media to store programs, such as programmable ROM (PROM), erasable PROM (EPROM), etc. The processor 1302 may communicate with other internal and external components through input/output (I/O) circuitry 1308 and bussing 1310, to provide control signals and the like. For example, data received from I/O connections 1308 or Internet connection 1328 may be processed in accordance with the present invention. External data storage devices may be coupled to I/O circuitry 1308 to facilitate assistance functions according to the present invention. Alternatively, such databases may be locally stored in the storage/memory of assistance server 1301, or otherwise accessible via a local network or networks having a more extensive reach such as the Internet 1328. The processor 1302 carries out a variety of functions as is known in the art, as dictated by software and/or firmware instructions.

Assistance server 1301 may also include one or more data storage devices, including hard and floppy disk drives 1312, CD-ROM drives 1314, and other hardware capable of reading and/or storing information such as DVD, etc. In one embodiment, software for carrying out the assistance operations in accordance with the present invention may be stored and distributed on a CD-ROM 1316, diskette 1318 or other form of media capable of portably storing information. These storage media may be inserted into, and read by, devices such as the CD-ROM drive 1314, the disk drive 1312, etc. The software may also be transmitted to assistance server 1301 via data signals, such as being downloaded electronically via a network, such as the Internet. Terminal hosted group assistance server 1301 is coupled to a display 1320, which may be any type of known display or presentation screen, such as LCD displays, plasma display, cathode ray tubes (CRT), etc. A user input interface 1322 is provided, including one or more user interface mechanisms such as a mouse, keyboard, microphone, touch pad, touch screen, voice-recognition system, etc.

Assistance server 1301 may be coupled to other computing devices, such as the landline and/or wireless terminals via a network. The server may be part of a larger network configuration as in a global area network (GAN) such as the Internet 1328, which allows ultimate connection to the various landline and/or mobile client/watcher devices.

The foregoing description of the various embodiments of the invention has been presented for the purposes of illustration and description. It is not intended to be exhaustive or to limit the invention to the precise form disclosed. Many modifications and variations are possible in light of the above teaching. Thus, it is intended that the scope of the invention be limited not with this detailed description, but rather determined from the claims appended hereto.

What is claimed is:

1. A method of conducting group hosting functions using a mobile terminal, comprising:
   establishing a wireless connection between the mobile terminal and a plurality of participating terminals;
   receiving messages from the plurality of participating terminals that relate to a common activity between the plurality of participating terminals;
   providing services to the plurality of participating terminals in response to the messages, wherein the mobile terminal facilitates the services provided; and
   providing a starting page, hosted by the mobile terminal, containing markup content to the plurality of participating terminals.

2. The method according to claim 1, wherein the wireless connection includes a proximity connection.

3. The method according to claim 2, wherein the proximity connection is facilitated with a Bluetooth communication stack.

4. The method according to claim 1, wherein the starting page contains links to other markup content.

5. The method according to claim 4, wherein the other markup content is hosted by the mobile terminal.

6. The method according to claim 4, wherein the other markup content is hosted by an assistance server.

7. The method according to claim 4, wherein the mobile terminal facilitates browsing of the starting page and the other content by the participating terminals.

8. The method according to claim 1, wherein the services are provided by a combination of the mobile terminal and an assistance server.

9. The method according to claim 1, wherein the services are provided by the mobile terminal.

10. A group hosting system, comprising:
a group of mobile terminals configured to be wirelessly coupled to provide communication relative to an activity common to the group of mobile terminals;
an assistance server configured to be wirelessly coupled to a host terminal to support services provided by the host terminal; and
a host terminal arranged to receive the communication from the group of mobile terminals, wherein services are provided to the group of mobile terminals by the host terminal to facilitate the activity and the host terminal is configured to mediate browsing conducted between the group of mobile terminals and the assistance server.

11. The group hosting system according to claim 10, wherein the communication between the group of mobile terminals and the host terminals includes a proximity connection enabled by a Bluetooth communication stack.

12. The group hosting system according to claim 11, wherein the communication includes content that is downloaded directly from the host terminal to the group of mobile terminals.

13. The group hosting system according to claim 12, wherein the content is adapted by the host terminal prior to downloading.

14. The group hosting system according to claim 10, wherein the host terminal interoperates with the assistance server to maintain presence information associated with the group of mobile terminals.

15. The group hosting system according to claim 10, wherein the host terminal interoperates with the assistance server to download content requested by the group of mobile terminals from the assistance server.

16. The group hosting system according to claim 15, wherein the host terminal adapts the content using capability parameters received from the assistance server.

17. A mobile terminal configured to be wirelessly coupled to a network which includes a group of mobile terminals configured to operate in accordance with a group activity, the mobile terminal comprising:

a memory capable of storing at least one of a protocol module and a hosting module;
a processor coupled to the memory and configured by the protocol module to enable message exchange with the group of mobile terminals; and
a transceiver configured to facilitate the message exchange with the group of mobile terminals, wherein the hosting module facilitates group related services and provides a starting page, hosted by the mobile terminal, containing markup content to the group of mobile terminals.

18. The mobile terminal according to claim 17, wherein the transceiver facilitates content download from the mobile terminal to the group of mobile terminals.

19. The mobile terminal according to claim 18, wherein the mobile terminal is configured to adapt the content prior to download according to capability parameters associated with the group of mobile terminals.

20. A computer-readable medium having instructions stored thereon which are executable by a mobile terminal for providing group host services to a group of mobile terminals, the instructions configured to at least cause a mobile terminal to:
establish a wireless connection to the group of mobile terminals;
maintain a list of mobile terminals receiving the group host services; and
interact with the group of mobile terminals, wherein the interaction relates to a common activity shared by the group of mobile terminals and includes hosting a starting page containing markup content.

21. An assistance server configured to be coupled to a mobile group hosting terminal, the assistance server comprising:
means for establishing a wireless connection to the mobile group hosting terminal;
means for receiving support requests from the mobile group hosting terminal; and
means for providing assistance to the mobile group hosting terminal in response to the support requests, wherein providing assistance includes hosting markup content accessible via one or more links hosted by the mobile group hosting terminal.

22. A computer-readable medium having instructions stored thereon which are executable by an assistance server, the instructions configured to at least cause an assistance server to:
establish a wireless connection to a mobile group hosting terminal;
receive support requests from the mobile group hosting terminal; and
provide assistance to the mobile group hosting terminal in response to the support requests including hosting markup content accessible via one or more links hosted by the mobile group hosting terminal.

* * * * *

UNITED STATES PATENT AND TRADEMARK OFFICE
CERTIFICATE OF CORRECTION

PATENT NO.        : 7,352,997 B2
APPLICATION NO. : 10/641329
DATED             : April 1, 2008
INVENTOR(S)       : Torvinen Page 1 of 1

It is certified that error appears in the above-identified patent and that said Letters Patent is hereby corrected as shown below:

Col. 4, line 52: "105 and 109" should read --Base Station Controller (BSC) 105 and 109--.

Col. 13, line 30: "scenario 100" should read --scenario 1100--.

Signed and Sealed this

Fifth Day of August, 2008

JON W. DUDAS
*Director of the United States Patent and Trademark Office*